United States Patent Office 3,385,192
Patented May 28, 1968

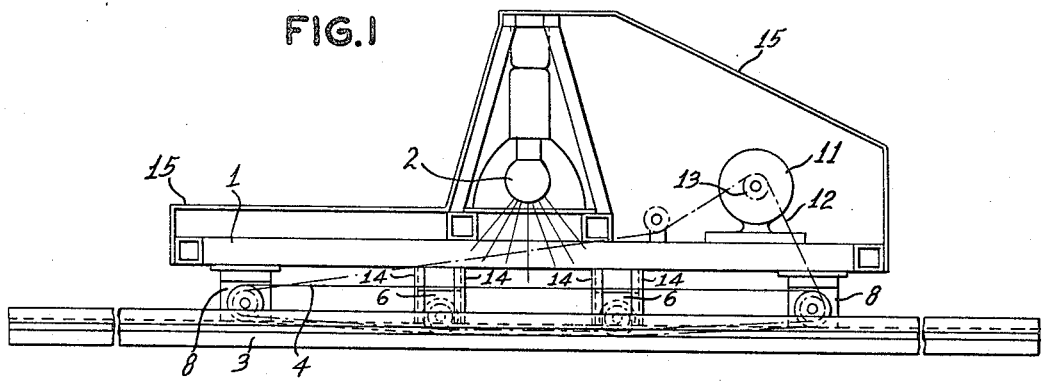
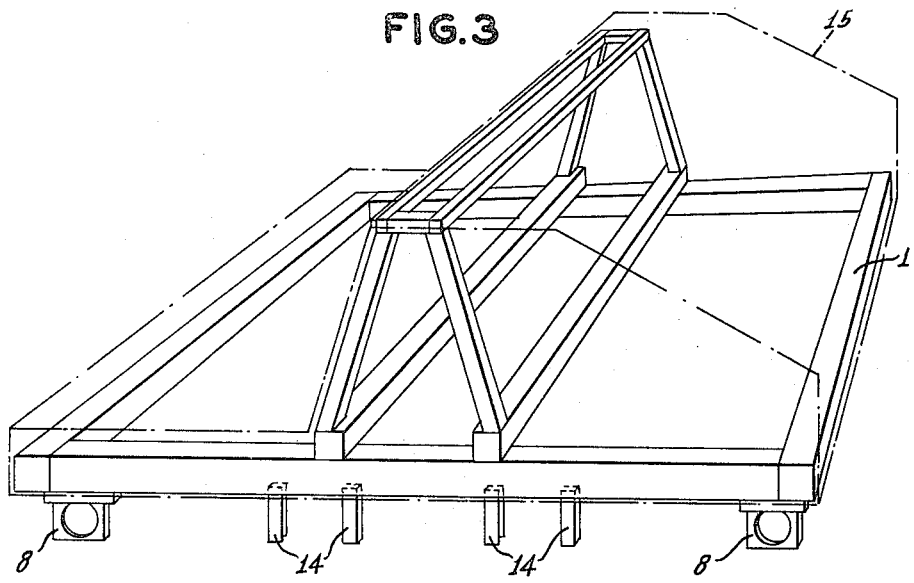

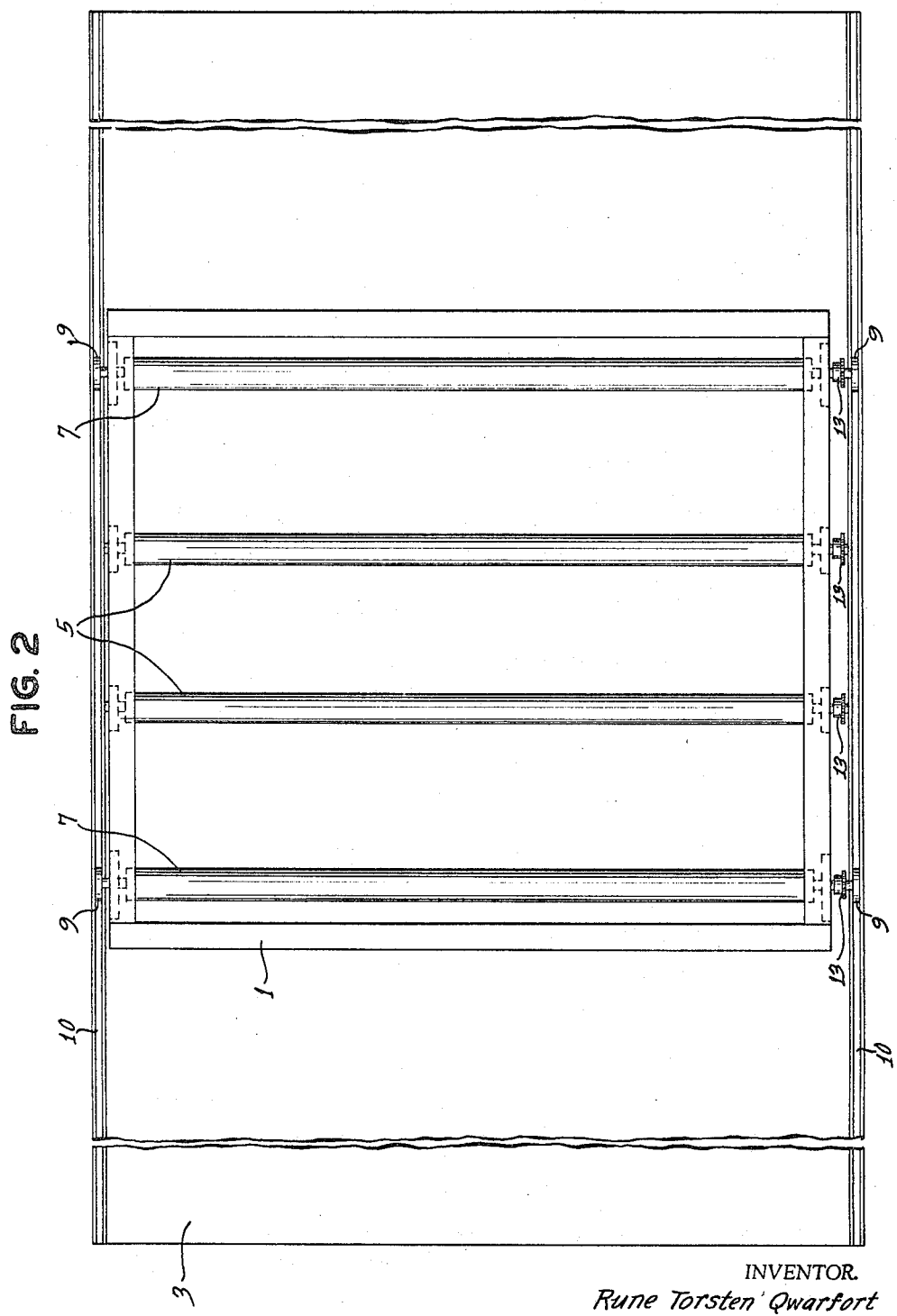

3,385,192
PHOTOPRINTING APPARATUS AND PROCESS
Rune Torsten Qwarfort, Hoganas, Sweden, assignor to Kalle Aktiengesellschaft, Wiesbaden-Biebrich, Germany
Filed Apr. 22, 1965, Ser. No. 450,033
Claims priority, application Germany, Apr. 25, 1964, K 52,792
6 Claims. (Cl. 95—75)

ABSTRACT OF THE DISCLOSURE

This invention relates to a photoprinting apparatus comprising a printing table, a movable carriage mounted on the table and carrying a light source and an endless light-pervious belt, belt-supporting pressure rollers mounted on the carriage, which rollers press the belt onto the table on both sides of the light source thereby forming an exposure area between them, the pressure rollers being mounted between two belt-supporting guide rollers which support the belt above the contact level of the belt on the table, and the included angle between the table and a portion of the belt between a guide roller and a pressure roller being between about 2 to 6°.

---

One method of producing prints with light-sensitive printing material is to place stencils, which correspond to the images to be reproduced, on a web of the printing material supported on a printing table and then to run a carriage, on which is mounted an appropriate light-source, over the material covered by the stencils in a manner such that the field of exposure produced at the exposure surface by the light source moves gradually over the entire length of the material to be exposed. Processes of this kind are used, for example, in the textile industry in order to produce cutting patterns from a single set of stencils. Apparatuses of this nature used hitherto have certain drawbacks that have not yet been eradicated. One such drawback is that the stencils are not pressed firmly enough on to the material during exposure. This drawback has itself been obviated by placing a sheet of transparent plastic material on the stencils. Although this obviates one drawback, it creates another in that the air pressure created when the sheet of plastic material is placed on the stencils displaces them slightly.

The present invention provides a photo-printing apparatus comprising a printing table and a traveling lamp carriage mounted to move over the table, the carriage including means for so supporting an endless, light-pervious belt that, during movement of the carriage over the table, the belt is progressively contacted with printing material on the table and lifted therefrom, the arrangement being such that exposure can take place while the belt is pressing the printing material onto the table. The aforementioned displacement of the stencils occurs much less frequently when the printing apparatus of the invention is used. Preferably, the carriage includes pressure rollers around which the belt passes and which are so positioned to press the belt onto the table that exposure light can impinge upon an exposure area between the rollers. The belt then lies flat on the exposure area between two pressure rollers and, when the lamp carriage is in motion, it is pressed onto the exposure surface by the front roller and lifted off by the rear roller. The endless, light-pervious belt may be made from a transparent plastic film, for example, a plastic film made of polyethylene terephthalate or a polyamide. However, it is more advantageous to use a transparent belt made from a netting or fabric of transparent or translucent plastic filaments, for example filaments made from a polyamide, polyethylene terephthalate, polyacrylonitrile, a cellulose derivative or regenerated cellulose.

The pressure rollers may carry the full weight of the carriage. It is much more advantageous, however, to provide the lamp carriage with supporting wheels and the printing table with rails for the supporting wheels to run on. The wheels are mounted in fixed positions on the frame of the carriage and carry most of the weight thereof. When the carriage is thus provided with wheels, the pressure rollers are mounted in a manner such that they are capable of yielding to pressure in a vertical direction relative to the frame of the carriage. This resilience in a vertical direction can be achieved, for example, by mounting the bearings in which the axles of the supporting wheels are mounted in guides which permit the bearings to move in a vertical direction. The effect of this resilient mounting of the pressure rollers, which press the belt onto the exposure area by their own weight, with or without an additional load, is to enable the belt to yield to any unevenness that may be present in the exposure area. The term "exposure area" as used herein refers to the surface of the printing table, printing material and stencil irradiated by the light source during the exposure.

During the printing process, the lamp carriage generally travels first in one direction and then in the other.

The endless belt advantageously passes around at least three rollers instead of two. In one embodiment of the apparatus that has been found to be highly advantageous, the carriage is provided with two guide rollers in addition to the two pressure rollers, the guide rollers being disposed above the exposure area and not in contact therewith. They are positioned parallel to the pressure rollers, one being mounted in front of the front pressure roller and one behind the rear pressure roller. It is less advantageous to have only one guide roller mounted above the two pressure rollers. When the lamp carriage is provided with only one guide roller, it is advantageously operated in one direction only, the guide roller being in the front of the carriage, with reference to the operating direction.

It has been found to be especially advantageous when two guide rollers, as above, are mounted on the carriage frame in a manner such that the two sections of belt between the pressure rollers and the guide rollers are at an angle of 2° to 6°, preferably 4°, to the exposure area.

To have the guide rollers and belt mounted in such a manner is the best method of ensuring that the stencils placed on the printing material are not displaced when the lamp carriage passes over them.

It has been found to be advantageous to provide all embodiments of the printing apparatus with the supporting wheels described above. When the lamp carriage is provided with front and rear guide rollers mounted slightly above the exposure area, it is decidedly advantageous for the supporting wheels to be mounted on the same axles as the guide rollers, thus causing the guide rollers to rotate with the wheels, and for the wheels to have the same diameter as the pressure rollers. In this case, the rails must be mounted at the same height above the exposure area of the printing table as the guide rollers.

The invention is further illustrated in the accompanying drawings, in which:

FIGURE 1 is a view in elevation of one embodiment of a printing apparatus according to the invention, FIGURE 2 is a plan view of the apparatus of FIGURE 1, and FIGURE 3 is a perspective view of the frame of the lamp carriage.

Referring to the drawings, a light source 2 is mounted on the frame 1 of the lamp carriage, the light being directed onto the surface of a printing table 3. A belt of a net-like fabric made from nylon-type polyamide filaments and having a mesh size of about 2 millimeters is passed around two pressure rollers 5 and two guide rollers 7, all having the same diameter, the rollers 5 and 7 being mounted in bearings 6 and 8, respectively. The wheels 9, having the same diameter as the pressure rollers and guide rollers, are rigidly mounted on the fixed axles of the guide rollers 7. They run on the rails 10 which are mounted on both sides, and slightly above, the exposure area, which is, in effect, the surface of the table 3. The rails are positioned at a higher level than the exposure area in order to compensate for the difference in height between the pressure rollers and the guide rollers. The height at which the guide rollers are positioned above the exposure area is such that the sections of belt between the guide rollers and the pressure roller nearest to each guide roller is at an angle of about 4° to the exposure area.

The supporting wheels carry most of the weight, whereas the pressure rollers bear upon the belt with their own weight only. The bearings 6 in which the pressure rollers are mounted are, in turn, mounted in bearing guides 14 in which they can move up and down in a vertical direction. The bearing guides 14 may include, for example, rails which are U-shaped in transverse section and which are mounted on the carriage frame 1. As a result of this arrangement, the pressure rollers are capable of yielding to any unevenness that might be present in the exposure area. The supporting wheels, guide rollers and pressure rollers are driven by an electric motor 11. The power is transmitted by means of a drive chain 12 and the sprockets 13, one sprocket being rigidly mounted on each axle of each guide roller and pressure roller. This ensures that all four rollers and the supporting wheels have the same peripheral speed. The tension of the chain 12 is advantageously controlled by means of a chain adjuster.

As shown in the drawings, the light emitted by the light source 2 must pass through the moving belt 4 twice before it impinges on the exposure area. The reduction in intensity resulting therefrom is generally only slight and can be easily tolerated. However, should it be desirable to minimize this reduction in intensity, the light source may be mounted within the zone around which the belt moves. When this arrangement is employed, it may be necessary to use more guide rollers for the belt, in addition to those shown in the drawings.

The light source may be any kind of light source used in photoprinting processes; selection naturally depends on the kind of printing material to be used. The same applies to the mechanical components of the apparatus. When the machine is in operation, it will generally be provided with a cover 15. It is often advantageous to incorporate a fan in the apparatus to provide cooling for the light source.

It will be obvious to those skilled in the art that many modifications may be made within the scope of the present invention without departing from the spirit thereof, and the invention includes all such modifications.

What is claimed is:

1. A photoprinting apparatus comprising a printing table, a movable carriage mounted on the table and carrying a light source and an endless light-pervious belt, belt-supporting pressure rollers mounted on the carriage, which rollers press the belt onto the table on both sides of the light source thereby forming an exposure area between them, the pressure rollers being mounted between two belt-supporting guide rollers which support the belt above the contact level of the belt on the table, and the included angle between the table and a portion of the belt between a guide roller and a pressure roller being about 2 to 6°.

2. A photoprinting apparatus according to claim 1 in which carriage-supporting wheels having the same diameter as the guide rollers are mounted on a common axle, the wheels running on rails fixed to the table.

3. A photoprinting apparatus according to claim 1 in which the pressure rollers are vertically movable in bearing guides.

4. A photoprinting apparatus according to claim 2 in which the carriage-supporting wheels, pressure rollers, and guide rollers are driven at the same peripheral speed by a chain and sprocket drive.

5. A photo-printing apparatus according to claim 1 in which the belt is made of a wide mesh at least translucent fabric.

6. A photo-printing apparatus according to claim 5 in which the fabric is made of plastic filaments.

References Cited

UNITED STATES PATENTS

| | | | |
|---|---|---|---|
| 744,039 | 11/1903 | Brown | 95—75 |
| 2,518,208 | 8/1950 | Weiss | 95—73 |
| 2,905,070 | 9/1959 | Gelb | 95—75 |
| 2,988,979 | 6/1961 | Sigler | 95—76 |

MORTON ANSHER, *Primary Examiner.*

M. H. HAYES, *Assistant Examiner.*